US007420626B1

(12) United States Patent
Pillay et al.

(10) Patent No.: US 7,420,626 B1
(45) Date of Patent: Sep. 2, 2008

(54) SYSTEMS AND METHODS FOR DETECTING A CHANGE IN A SEQUENCE OF INTERLACED DATA FIELDS GENERATED FROM A PROGRESSIVE SCAN SOURCE

(75) Inventors: Sanjay R. Pillay, Austin, TX (US); Brian F. Bounds, Dripping Springs, TX (US); William Lynn Gallagher, Austin, TX (US)

(73) Assignee: Magnum Semiconductor, Inc., Fremont, CA (US)

( * ) Notice: Subject to any disclaimer, the term of this patent is extended or adjusted under 35 U.S.C. 154(b) by 498 days.

(21) Appl. No.: 11/167,682

(22) Filed: Jun. 27, 2005

(51) Int. Cl.
H04N 9/64 (2006.01)

(52) U.S. Cl. .............. 348/700; 348/441; 348/448; 348/452

(58) Field of Classification Search ........ 348/700–701, 348/441, 448, 451–452, 458–459; H04N 9/64
See application file for complete search history.

(56) References Cited

U.S. PATENT DOCUMENTS

| | | | | |
|---|---|---|---|---|
| 5,532,751 | A * | 7/1996 | Lui | ............................. 348/452 |
| 6,459,455 | B1 * | 10/2002 | Jiang et al. | ................... 348/452 |
| 7,206,028 | B2 * | 4/2007 | Yeh et al. | ..................... 348/448 |
| 7,286,185 | B2 * | 10/2007 | Wong et al. | .................. 348/452 |
| 2006/0077305 | A1 * | 4/2006 | Wyman | ...................... 348/700 |

* cited by examiner

Primary Examiner—Trang U Tran
(74) Attorney, Agent, or Firm—James J. Murphy; Thompson & Knight, LLP (57) ABSTRACT

A method of detecting a change in a sequence of video data fields generated from a progressive scan source includes receiving first and second interlaced fields of a corresponding progressive scan frame from a sequence of interlaced fields generated from progressive scan source. Pixel values corresponding to pixel positions of pixel lines of a first parity of the first field are weaved with pixel values corresponding to pixel positions of pixel lines of a second parity of the second field. For each pixel value corresponding to each pixel position of each pixel line of the second field after weaving, a check is performed for the corresponding pixel position for feathering due to motion. A number of detected pixel positions with feathering due to motion is counted and compared against a threshold. A determination is made that the sequence of fields generated from the progressive scan source has not changed when the number of counted pixel positions due to motion is below the threshold and a determining that the sequence of fields generated from the progressive scan source has changed when the number of counted pixel positions due to motion is above the threshold.

20 Claims, 11 Drawing Sheets

*Interlaced*

FIG. 3A

*Progressive Scan*

SYSTEMS AND METHODS FOR DETECTING A CHANGE IN A SEQUENCE OF INTERLACED DATA FIELDS GENERATED FROM A PROGRESSIVE SCAN SOURCE

CROSS REFERENCE TO RELATED APPLICATION

The following co-pending and co-assigned applications contain related information and are hereby incorporated by reference:

Ser. No. 11/167,756, Bounds and Gallagher entitled CIRCUITS AND METHODS FOR DETECTING 2:2 ENCODED VIDEO AND SYSTEMS UTILIZING THE SAME, filed Jun. 27, 2005; and Ser. No. 11/167,877, Bounds and Gallagher entitled CIRCUITS AND METHODS FOR DEINTERLACING VIDEO DISPLAY DATA AND SYSTEMS USING THE SAME, filed Jun. 27, 2005.

FIELD OF INVENTION

The present invention relates in general to video processing techniques, and in particular, to circuitry and methods for detecting a change in a sequence of interlaced data fields generated from a progressive scan source.

BACKGROUND OF INVENTION

Two primary video format standards are utilized worldwide to record, transmit, and display composite video data, namely, the National Television Systems Committee (NTSC) and the Phase Alternating Line (PAL) standards. Both the NTSC and PAL standards define interlaced video systems in which one frame of display pixels is partitioned into alternating interlaced fields, with each interlaced field updated at twice the update rate of the frame. Additionally, many digital versatile disk (DVD) players, DVD player-recorders, and similar video recording and playback systems, output data in an interlaced format, depending on the format used to record the given playback media.

On the other hand, many state of the art display systems, such as high definition television (HDTV) sets, generate displays using a progressive scan format. In the progressive scan format, video data are transmitted and displayed in frames which are not partitioned into fields. In other words, each display frame is generated by sequentially scanning through the lines of each frame at the original field update rate. Hence, in order to interface an interlaced video source, such as television cable interface or a DVD player playing-back an interlaced DVD, with a progressive-scan display system, such as a HDTV set, deinterlacing must be performed.

The 3:2 pulldown technique is typically utilized to convert film into interlaced NSTC video, for example during recording onto DVD or during television broadcast. Generally, film is generated with a frame rate of twenty four (24) frames per second. On the other hand, frames of interlaced NTSC video are generated at a rate of thirty (30) frames per second from odd and even fields having an update rate of approximately sixty (60) fields per second. Hence, 3:2 pulldown compensates for differences between the film frame rate and the NTSC frame rate essentially by generating ten (10) interlaced fields for every four (4) frames of film.

In particular, during 3:2 pulldown, every other frame of film generates three (3) interlaced fields and the intervening frames generate two (2) interlaced fields. For example, if a given frame of film generates three (3) interlaced fields in the sequence odd, even, odd, then the next frame generates two (2) interlaced fields in sequence even, odd, the following frame generates three (3) interlaced fields in the sequence even, odd, even, and so on.

Occasionally, during the video production, processing errors are made during editing, such that the 3:2 sequence of fields is broken. When such a break is reached during progressive scan playback, the processing system generating the progressive scan display must detect the break from the 3:2 sequence and compensate for any resulting display artifacts.

Current progressive scan display processors have the capability to detect breaks in a 3:2 video sequence. However, typically existing out-of-sequence detection techniques are subject to a significant latency, typically up to four (4) frames. During this latency period, unacceptable visible artifacts are generated in the display. Additionally, while it is possible to delay the output stream by four (4) frames, such that these artifacts can be removed, implementing such a delay is expensive in terms of both bandwidth and memory.

Given the increasing popularity of progressive scan display systems for playing back films from 3:2 interlaced data, improved techniques for required for detecting breaks in the 3:2 sequence are required, as well as efficient techniques for continuing to generate an artifact-free progressive scan display after out-of-sequence detection.

Given increasing popularity of progressive scan display systems, as well as the need to maintain compatibility with systems generating interlaced display data, new deinterlacing techniques are required. In particular, these deinterlacing techniques should allow for the generating of progressive scan displays from interlaced data created by 3:2 pulldown.

SUMMARY OF INVENTION

The principles of the present invention are embodied in systems and methods for detecting a change in a sequence of interlaced data fields generated from a progressive scan source, for example from an editing error or the crossing of a progressive frame boundary. According to one particular representative embodiment, a method of detecting a change in a sequence of video data fields generated from a progressive scan source is disclosed, which includes receiving first and second interlaced fields of a corresponding progressive scan frame from a sequence of interlaced fields generated from progressive scan source. Pixel values corresponding to pixel positions of pixel lines of a first parity of the first field are weaved with pixel values corresponding to pixel positions of pixel lines of a second parity of the second field. For each pixel value corresponding to each pixel position of each pixel line of the second field after weaving, a check is performed for the corresponding pixel position for feathering due to motion. A number of detected pixel positions with feathering due to motion is counted and compared against a threshold. A determination is made that the sequence of fields generated from the progressive scan source has not changed when the number of counted pixel positions due to motion is below the threshold, and a determination is made that the sequence of fields generated from the progressive scan source has changed when the number of counted pixel positions due to motion is above the threshold.

Embodiments of the present principles advantageously, detect an out-of-3:2 mode condition within one video frame, even in view of high vertical spatial frequency. Motion adaptive deinterlacing is then performed to generate progressive scan output frames, with a minimal number of artifacts, until the 3:2 mode resumes. Moreover, the principles of the present invention also embody motion adaptive deinterlacing techniques particularly suitable for generating the progressive scan frames during the out-of-3:2 mode condition.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-4 of the drawings, in which like numbers designate like parts.

Figure 1:
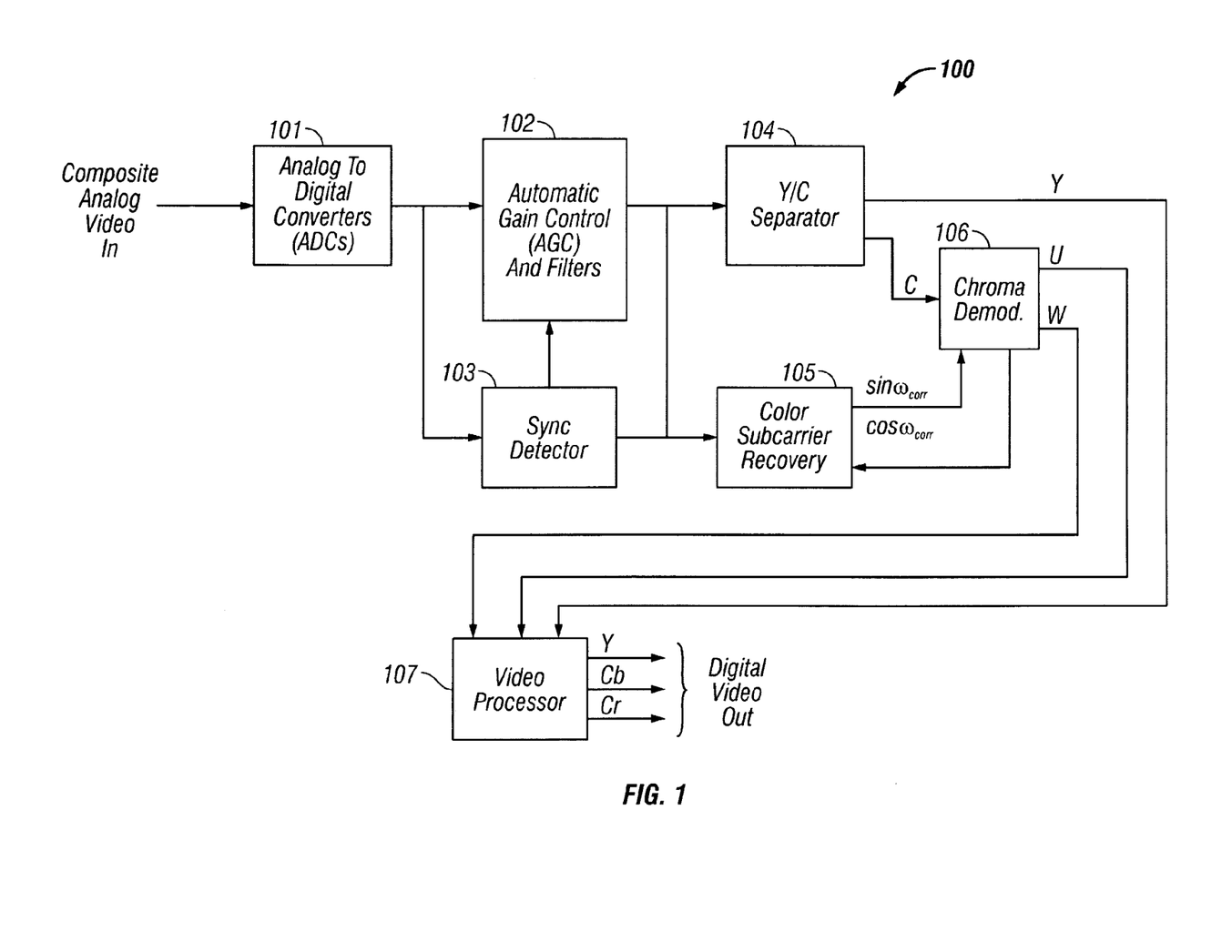
FIG. 1 is a high level block diagram of a representative audio-video system suitable for demonstrating the principles of the present invention.

FIG. 1 is a diagram of an exemplary analog to digital video decoder 100 suitable for describing the principles of the present invention. In the illustrated embodiment, video encoder converts a composite analog video input signal, in the YC format, into digital video data in the YCrCb component video format, although the inventive principles are not necessarily limited thereto.

In video encoder 100, the composite analog input video is converted into composite digital video in the YC format by analog to digital converters (ADCs) 101. The digitized YC video data are then passed through automatic gain control (AGC) and filters block 102. A sync detector 103 detects the vertical synchronization (VSYNC) signal, which controls the timing of the playback of each display field, and the horizontal synchronization signal (HSYNC), which controls the timing of the playback of each display line.

Y/C separator block 104 next separates the digital Y and C components of the digitized composite video data stream. The C component is demodulated into U and V color components by color subcarrier recovery block 105 and chroma demodulation block 106, described in further detail below. The Y, U, and V components are passed directly to video processor 107 for further processing to generate a YCrCb digital component video signal.

In the illustrated embodiment of audio-video recording and playback system 100, interlaced video to progressive scan video conversion (deinterlacing) is performed within video processor 107. In alternate embodiments, deinterlacing may be performed in a dedicated post-processor, which may be located within audio-video recording and playback system 100 or within an associated display system, such as a high definition television (HDTV).

Figure 2:
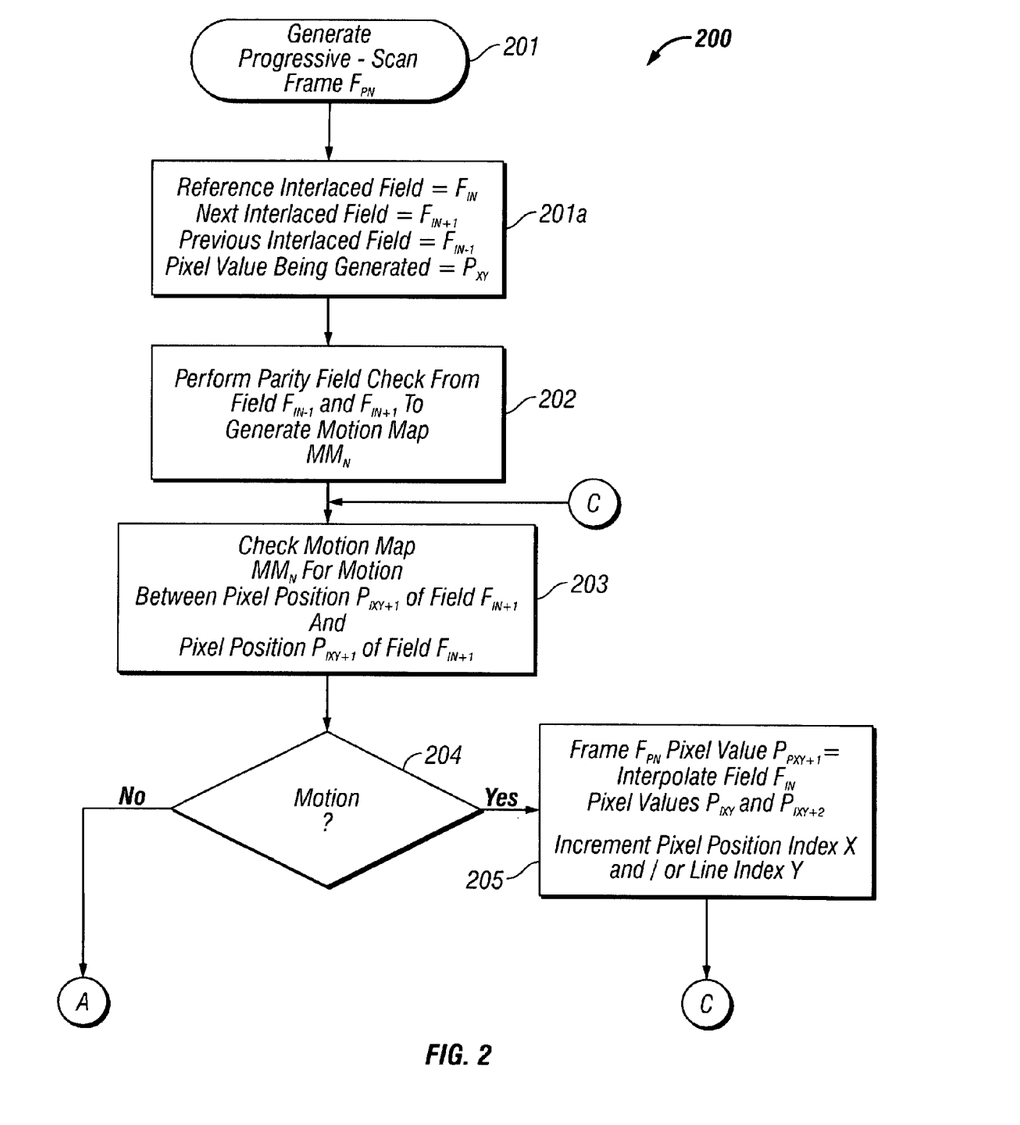
FIG. 2 is a flow chart of an exemplary deinterlacing procedure embodying the principles of the present invention.

FIG. 2 is a flow chart illustrating a representative method 200 for generating a sequence of frames of progressive scan video data from a sequence of fields of interlaced video data. For discussion purposes, FIGS. 3A and 3B are respectively conceptual diagrams of small sections of interlaced and progressive scan displays.

Figure 3A:
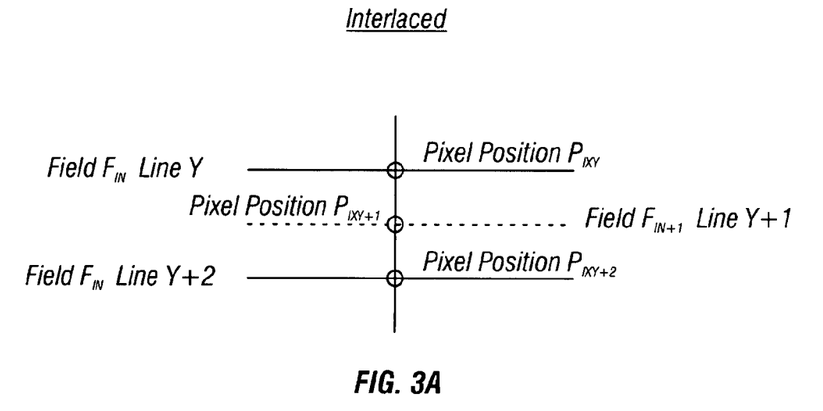
FIGS. 3A and 3B are conceptual diagrams of respective small sections of deinterlaced and progressive scan displays suitable for describing the exemplary nomenclature utilized in the flow chart of FIG. 2.
Figure 3B:
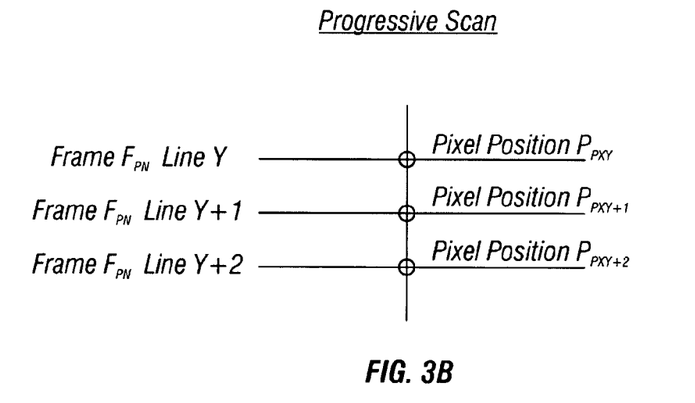

In the example shown in FIGS. 2, and 3A-3B, the current interlaced field is field $F_{IN}$, in which N is an integer and may be odd or even. In particular, as shown in FIG. 3A, the current line of current field $F_{IN}$ is line Y, wherein Y is also an integer, and the spatially following line of current field $F_{IN}$ is line Y+2. The temporally following interlaced field is field $F_{IN+1}$ and provides vertically adjacent line Y+1 when fields $F_{IN}$ and $F_{IN+1}$ are interlaced in a typical interlaced display system. Representative vertically aligned interlaced pixel are pixels $P_{IXY}$ and $P_{IXY+2}$ of the current field and pixel $P_{IXY+1}$ of the temporally following field $F_{IN+1}$, in which X is an integer representing the pixel position along lines Y, Y+1, and Y+2. Display pixel positions $P_{IXY}$ and $P_{IXY+2}$ of the current field and pixel position $P_{IXY+1}$ are represented by corresponding pixel values $P_{IXY}$, $P_{IXY+2}$ and $P_{IXY+1}$, including, for example luminance and chrominance values.

As shown in FIG. 3B, each progressive scan frame is designated $F_{PN}$, in which N is an integer. In the progressive scan frame $F_{PN}$, representative vertically adjacent pixels of three lines Y, Y+1, and Y+2, are designated $P_{PY}$ and $P_{PY+1}$, and $P_{PY+2}$. Pixel positions $P_{PXY}$ and $P_{PXY+1}$, and $P_{PXY+2}$ are represented by corresponding pixel values $P_{PXY}$ and $P_{PXY+1}$, and $P_{PXY+2}$, including, for example, luminance and chrominance values.

For discussion purposes, procedure 200 will be described by assuming interlaced field $F_{IN}$ is the reference field such that pixel lines Y and Y+2 of current interlaced field $F_{IN}$ provide lines Y and Y+2 of progressive scan frame $F_{PN}$. In this example, line Y+1, of progressive scan frame $F_{PN}$, and in particular pixel $P_{PXY+1}$, is being generated during the current iteration of procedure 200.

At block 201a, the reference interlaced field is set as field $F_{IN}$, the temporally preceding interlaced field becomes field $F_{IN-1}$, and the temporally following interlaced field becomes field $F_{IN+1}$. Thus, for example, if reference field $F_{IN}$ has even parity (i.e. is composed of even numbered pixel lines), then preceding field $F_{IN-1}$ and following field $F_{IN+1}$ both have odd parity (i.e. are composed of odd numbered pixel lines). On the other hand, if reference field $F_{IN}$ has odd parity, then preceding field $F_{IN-1}$ and following field $F_{IN+1}$ are both of even parity.

A motion map $MM_N$ is generated at block 202 by comparing the chrominance and luminance data of each pixel value of preceding field $F_{IN-1}$ against both a threshold value and the luminance and chrominance data of the corresponding pixel value of following field $F_{IN+1}$. In the illustrated embodiment, for a given one of the luminance and chrominance values of each pixel value, motion at the corresponding pixel position is detected when the absolute value of the difference between the corresponding pixel values in fields $F_{IN-1}$ and $F_{IN+1}$ is greater than the selected threshold value. The resulting motion map $MM_N$ is preferably a one (1) bit per pixel map, with the bit mapping to a given pixel position set to a logic one (1) to indicate a change in luminance, chrominance, or both luminance and chrominance of the corresponding pixel value between fields $F_{IN-1}$ and $F_{IN+1}$ (i.e. motion detected) or to a logic zero (0) to indicate no change in either luminance or chrominance of that pixel value between fields $F_{IN-1}$ and $F_{IN+1}$ (i.e. no motion detected). As discussed further below, motion maps generated at block 202 have lines of bits of either an odd or even parity, depending on the parity of the lines of the preceding and following fields being compared by parity check. In particular, if interlaced fields $F_{IN-1}$ and $F_{IN+1}$ are odd, the lines of motion $MM_N$ map represent odd pixel lines, and if interlaced fields $F_{IN-1}$ and $F_{IN+1}$ are even, the lines of motion map $MM_N$ represent even pixel lines.

For the generation of exemplary pixel value $P_{PXY+1}$ corresponding to display pixel position $P_{PXY+1}$, the corresponding bit in motion map $MM_N$ is checked at block 203 for motion between pixel values $P_{IXY+1}$ corresponding to display pixel position $P_{IXY+1}$ of preceding field $F_{IN-1}$ and following field $F_{IN+1}$. In other words, a check for motion is made between the pixel value for the same pixel position along the corresponding line of the temporally prior field of the same parity as the bit being generated and the pixel value for the same pixel position along the corresponding line of the next temporal field of the same parity as the bit being generated.

If motion is detected at decision block 204, then at block 205, pixel value $P_{PXY+1}$ of progressive scan frame $F_{PN}$ is generated by interpolating between pixel values of the current field, for example, between pixel values $P_{IXY}$ and $P_{IXY+2}$ corresponding to vertically aligned pixel positions $P_{IXY}$ and $P_{IXY+2}$ of reference field $F_{IN}$. In other words, in the present example, the current pixel value is generated by interpolating from the vertically adjacent pixel values of the line above and the line below the line being generated in the progressive scan frame. In alternative embodiments, other pixel values in the neighborhood of pixel value $P_{PXY+1}$ may be utilized in the interpolation operation. After interpolation at block 205, the pixel index X is incremented, and if the end of the current line has been reached, the line index Y is incremented, and procedure 200 loops-back to block 203 to initiate the generation of the next pixel value corresponding to the next pixel position in progressive scan frame $F_{PN}$.

On the other hand, if no motion is detected at decision block 204, then at block 206, pixel value $P_{PXY+1}$ of progressive scan frame $F_{PN}$ is generated by weaving in the corresponding pixel value $P_{IXY+1}$ of temporally preceding field $F_{IN+1}$. In other words, the current pixel value being generated is taken from the corresponding pixel value and line of the next interlaced field of the same parity as the progressive scan line being generated.

After weaving is performed at block 206, a check is made at block 207 for feathering at pixel position $P_{PXY+1}$ of progressive scan frame $F_{PN}$. Feathering is checked by comparing the characteristics of corresponding pixel value $P_{PXY+1}$ with the characteristics of the pixel values $P_{PXY}$ and $P_{PXY+2}$ corresponding to vertically adjacent pixel positions $P_{PXY}$ and $P_{PXY+2}$ of progressive scan frame $F_{PN}$. Specifically, the luminance and chrominance of pixel value $P_{PXY+1}$ are compared against the luminance and chrominance of pixel values $P_{PXY}$ and $P_{PXY+2}$ after weaving. If the luminance, chrominance, or both luminance and chrominance of weaved pixel value $P_{PXY+1}$ deviates by a threshold amount from that of both pixel values $P_{PXY}$ and $P_{PXY+2}$, a check for feathering is required because the single motion map parity check at block 203 can miss motion which occurs during the time between the generation of preceding field $F_{IN-1}$ and following field $F_{IN+1}$. On the other hand, feathering could be a representation of vertical spatial high frequency. Advantageously, one of the principles of the present invention allows for an accurate determination if any detected feathering represents actual motion or vertical spatial high frequency.

At decision block 208, feathering is detected when the magnitude of any change, in at least one of the luminance or chrominance values, between pixel value $P_{PXY+1}$ and both pixel values $P_{PXY}$ and $P_{PXY+2}$ exceeds a selected threshold, and the direction of change between pixel value $P_{PXY}$ and pixel value $P_{PXY+1}$ and the direction of change between pixel value $P_{PXY+1}$ and pixel value $P_{PXY+2}$ is the same. Otherwise, if any of these three conditions is not met, an absence of motion is detected at pixel position $P_{PXY+1}$.

If no feathering is detected, the weave performed at block 206 is accepted at block 209, and procedure 200 moves to the generation of the next pixel value corresponding to the next pixel position in progressive scan frame $F_{PN}$. In other words, the weaved pixel value $P_{PXY+1}$ is utilized in the corresponding pixel position in progressive scan frame $F_{PN}$.

In contrast, if feathering is detected at decision block 208, then historical value motion detection must be performed to determine if the feathering is the result of actual motion or the result of vertical spatial high frequency. Vertical spatial high frequency occurs when pixel values rapidly change because of sharp spatial changes in the display objects being generated, such as at the boundaries checker-board patterns or with fine resolution pixel patterns, such as fine display vertical object lines.

To detect historical motion at pixel position $P_{PXY+1}$, motion maps $MM_{N-Z-1}$ to $MM_{N-1}$, which were created at block 203 during the generation of Z number of temporally preceding progressive frames $F_{IN-Z-1}$ to $F_{IN-1}$, are combined into a single motion map (current motion map $MM_N$ is not included) in which Z is an integer, preferably less than ten (10). Specifically, a determination is made at decision block 210 as to the parity of the line of pixel position $P_{PXY+1}$ of the current pixel value $P_{PXY+1}$ being generated. If the line including pixel position $P_{PXY+1}$ has odd parity, then the odd map lines of even-line motion maps $MM_{N-Z-1}$ to $MM_{N-1}$ are generated by interpolation of the existing even motion map lines at block 211. If the line including pixel position $P_{PXY+1}$ has even parity, then the even map lines of odd-line motion maps $MM_{N-Z-1}$ to $MM_{N-1}$ are generated by interpolation of the existing odd motion map lines at block 212.

The interpolation operations performed at blocks 211 and 212 ensure that all Z number of motion maps $MM_{N-Z-1}$ to $MM_{N-1}$ have map lines of the same parity and therefore can be appropriately combined at block 213. Combination of memory maps $MM_{N-Z-1}$ to $MM_{N-1}$, is preferably accomplished by performing a logical-OR operation on a mapping-bit by mapping-bit basis. Consequently, at decision block 214, a determination can be made as to whether, over a history of the generation of Z number of previous progressive scan frames, motion has occurred at pixel position $P_{PXY+1}$.

If historical motion has not occurred at decision block 214, then at block 215, pixel value $P_{PXY+1}$ corresponding to pixel position $P_{PXY+1}$ is considered static in value (i.e. represents vertical spatial high frequency) and the weaving performed at block 206 is accepted for the generation of progressive scan frame $F_{PN}$ (i.e. weaved pixel value $P_{PXY+1}$ is utilized in progressive scan frame $F_{PN}$ at pixel position $P_{PXY+1}$). If, instead, motion is detected at decision block 214, then at block 216, pixel value $P_{PXY+1}$ for pixel position $P_{PXY+1}$ of progressive scan frame $F_{PN}$ is generated by interpolating between pixel values of current field $F_{IN}$, such as pixel values $P_{IXY}$ and $P_{IXY+1}$ corresponding to vertically aligned pixel positions Pixy and $P_{IXY+1}$ of reference field $F_{IN}$. After completion of the operations at blocks 215 and 216, procedure 200 returns to block 203 to generate the next progressive scan pixel, after incrementation of pixel index X and/or line index Y Advantageously, the frames of progressive scan video data are generated from fields of interlaced video with minimal artifacts, such as feathering, while at the same time the probability of falsely detecting artifacts due to spatial high frequency is minimized.

Figure 4:
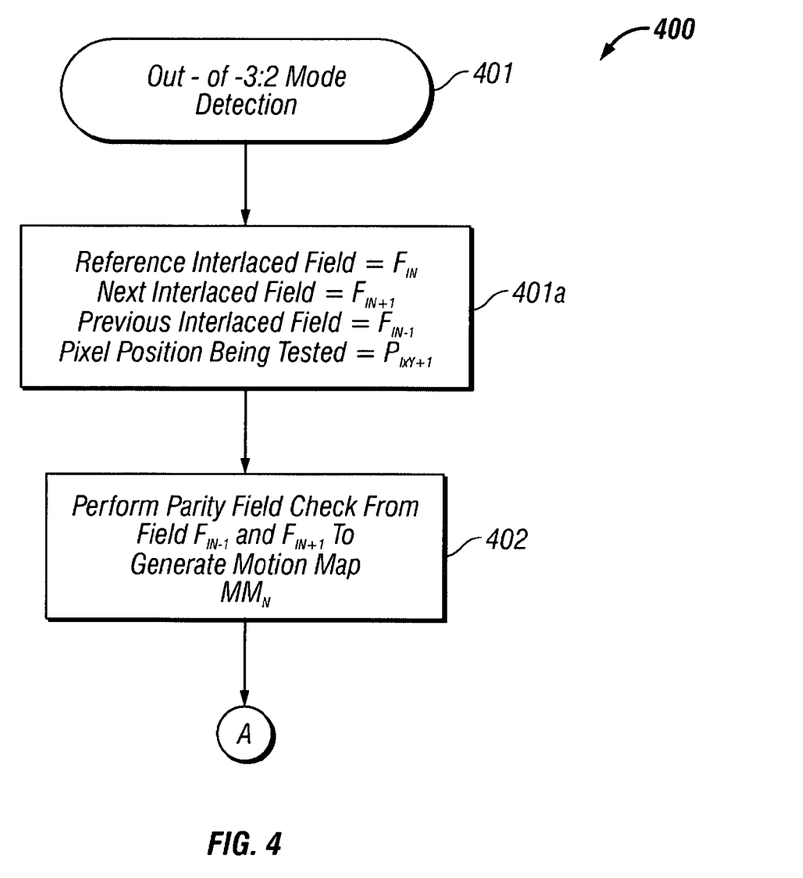
FIG. 4 is a flow chart of a representative out-of-3:2 mode detection procedure embodying the principles of the present invention.

FIG. 4 is a flow chart illustrating a representative procedure 400 for detecting an interruption in a sequence of fields of interlaced video data in the 3:2 video format. In alternate embodiments, procedure 400 may be utilized for detecting an interruption in a sequence of fields of interlaced data generated from a progressive scan source, such as interlaced fields generated with the 2:2 pull-down technique and computer generated graphics.

Procedure 400 begins at block 401, and, at block 401a, the reference interlaced field is set as $F_{IN}$, the previous interlaced field becomes field $F_{IN-1}$, and the next interlaced field becomes field $F_{IN+1}$. Thus, for example if reference field $F_{IN}$ has even parity (i.e. is composed even numbered pixel lines), then previous field $F_{IN-1}$ and next field $F_{IN+2}$ both have odd parity (i.e. are composed of odd numbered pixel lines). On the other hand, if reference field $F_{IN}$ has odd parity, then previous field $F_{IN-1}$ and next field $F_{IN+1}$ are both of even parity. The pixel position being tested is pixel position $P_{XY+1}$, which spatially falls between vertically aligned pixel positions $P_{IXY}$ and $P_{IXY+2}$ of current (reference) field $F_{IN}$. Pixel position $P_{XY+1}$ is associated with a pixel value $P_{XY+1}$, and pixel positions Pixy and $P_{IXY+2}$ are associated with pixel values Pixy and $P_{IXY+2}$.

A motion map $MM_N$ is generated at block 402 by comparing the chrominance and luminance data of each pixel value associated with each pixel position of previous field $F_{IN-1}$ with the luminance and chrominance data of each pixel value of each corresponding pixel position of next field $F_{IN+1}$. Motion map $MM_N$ is preferably a one (1) bit per pixel map, with the bit mapping to a given pixel set to a logic one (1) to indicate a change in pixel value at a given pixel position between fields $F_{IN-1}$ and $F_{IN+1}$ (i.e. motion detected) or to a logic zero (0) to indicate no change in pixel value at a given pixel position between fields $F_{IN-1}$ and $F_{IN+2}$ (i.e. no motion detected). Motion maps generated at block 402 have an odd or even line parity depending on the line parity of fields $F_{IN-1}$ and $F_{IN+1}$ being compared by parity check. In particular, if interlaced fields $F_{IN-1}$ are $F_{IN+1}$ are odd, the lines of motion $MM_N$ map represent odd pixel lines, and if interlaced fields $F_{IN-1}$ are $F_{IN+1}$ are even, the lines of motion map $MM_N$ represent even pixel lines.

At block 403, pixel values Pixy and $P_{IXY+2}$ corresponding to pixel positions $P_{IXY}$ and $P_{IXY+2}$ of current field $F_{IN}$ are weaved with the corresponding pixel value $P_{XY+1}$ associated with pixel position $P_{XY+1}$ of next field $F_{IN+1}$. After weaving is performed at block 403, a check is made at block 404 for feathering at pixel position $P_{PXY+1}$. Feathering is checked by examining the weave of pixel value $P_{PXY+1}$ and pixel values $P_{PXY}$ and $P_{PXY+2}$. Specifically, at decision block 405, feathering is detected when the magnitude of any change in at least one of the luminance or chrominance values of pixel value $P_{PXY+1}$ with respect to both pixel values $P_{PXY}$ and $P_{PXY+2}$ exceeds a selected threshold, and the direction of change between pixel value $P_{PXY}$ and pixel value $P_{PXY+1}$ and the direction of change between pixel value $P_{PXY+1}$ and pixel value $P_{PXY+2}$ is the same. Otherwise, if any of these three conditions is not met, an absence of feathering is detected at pixel position $P_{PXY+1}$ is the same.

If no feathering is detected, then at block 406, the pixel position index X and/or the pixel line index Y increments, and procedure 400 moves to test the next pixel position. In contrast, if feathering is detected at decision block 405, then historical motion detection must be performed to determine if the feathering is the result of actual motion or the result of vertical spatial high frequency. Vertical spatial high frequency occurs when pixels values rapidly change because of sharp spatial changes in display objects, such as at the boundaries checker-board patterns or with fine resolution structures, such as single-pixel wide objects.

To detect historical motion at pixel $P_{PXY+1}$, motion maps $MM_{N-Z}$ to $MM_N$, which were created during the generation of Z number of previous progressive frames $F_{IN-Z}$ to $F_{IN}$, are combined into single motion map (current motion map $MM_N$ is included in procedure 400). Preferably, Z is an integer less than ten (10). Specifically, a determination is made at decision block 407 as to the parity of current pixel position $P_{PXY+1}$. If pixel position $P_{PXY+1}$ has odd parity (i.e. is part of an odd line Y+1), then the odd map lines of even-line motion maps $MM_{N-Z}$ to $MM_N$ are generated by interpolation of the existing even motion map lines at block 408. If pixel position $P_{PXY+1}$ has even parity (i.e. is part of an even line Y+1), then the even map lines of odd-line motion maps $MM_{N-Z}$ to $MM_N$ are generated by interpolation of the existing odd motion map lines at block 409.

The interpolation operations performed at blocks 408 and 409 ensure that all Z number of motion maps $MM_{N-Z}$ to $MM_N$ all have the same number of odd and even map lines of the same parity, and therefore can be appropriately combined at block 410. Combination of memory maps $MM_{N-Z}$ to $MM_N$, is preferably accomplished by performing a logical-OR operation on a mapping-bit by mapping-bit basis. Consequently, at decision block 411, a determination can be made as to whether, over a history of Z number of previous fields, motion has occurred at pixel position $P_{PXY+1}$.

If historical motion has not occurred at decision block 411, then at block 412, pixel position $P_{PXY+1}$ is considered static (i.e. represents vertical spatial high frequency) and at block 416 the pixel position index X and/or the line index Y increment, and procedure 400 loops back to block 403 to test the next pixel. If instead motion is detected at decision block 411, then at block 413 pixel position $P_{PXY+1}$ is considered a pixel position with feathering due to motion, and the count of feathered pixel positions with feathering increments at block 414. If the end of the frame has not been reached, at block 415, then at block 416 the pixel position index X and/or the line index Y increment, and procedure 400 loops back to block 403 to test the next pixel.

Otherwise, when the pixels of entire current frame have been tested, then a check is performed at block 417 to determine whether the number of feathered pixels with feathering due to motion for the current frame is above a selected threshold. It this count is below the threshold, the sequence of fields remains in the 3:2 mode (i.e. no interruption in the 3:2 generated stream) at block 418. In contrast, if the count is above the threshold, then, at block 419, either the 3:2 mode sequence has been broken, or the sequence remains in the 3:2 mode, but the current frame was generated by fields with both spatial vertical high frequency and motion and which were on different sides of a film frame boundary. In either case, procedure 400 continues to block 420.

At block 420, motion adaptive deinterlacing is performed to generate progressive scan frames from the sequence of interlaced fields, preferably utilizing procedure 200 discussed above in conjunction with FIG. 2. In parallel with the adaptive motion processing, a parity check is made at block 421 between the sequence of fields to determine if a pattern is established indicating that the 3:2 mode fields are again being received. In particular, for an embodiment where procedure 200 is utilized for motion adaptive deinterlacing, the results of the parity check performed at block 202 are monitored for the pattern L, H, H, H, H, L, H, H, H, H, in which L represents a count of pixels with motion below a given threshold and H represents a count of pixels with motion above the threshold. Once this pattern is detected, procedure 400 repeats and resumes monitoring for an out-of-3:2 mode condition.

Advantageously, the principles of the present invention detect an out-of-3:2 mode condition within one video frame, even in view of high vertical spatial frequency. Motion adaptive deinterlacing is then performed to generate progressive scan output frames, with a minimal number of artifacts, until the 3:2 mode resumes.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method of detecting a change in a sequence of video data fields generated from a progressive scan source comprising:
   receiving first and second interlaced fields of a corresponding progressive scan frame from a sequence of interlaced fields generated from a progressive scan source;
   weaving pixel values corresponding to pixel positions of pixel lines of a first parity of the first field with pixel values corresponding to pixel positions of pixel lines of a second parity of the second field;
   for each pixel value corresponding to each pixel position of each pixel line of the second field after weaving, checking for the corresponding pixel position for feathering due to motion;
   counting detected pixel positions with feathering due to motion;
   comparing a number of counted pixel positions with feathering due to motion against a threshold value;
   determining that the sequence of fields generated from the progressive scan source has not changed when the number of counted pixel positions with feathering due to motion is below the threshold value; and
   determining that the sequence of fields generated from the progressive scan source has changed when the number of counted pixel positions with feathering due to motion is above the threshold value.

2. The method of claim 1, wherein the sequence of fields are generated from the progressive scan source by a 3:2 pull-down algorithm.

3. The method of claim 1, further comprising in response to determining whether the sequence of fields has changed, determining whether the sequence of fields has been interrupted.

4. The method of claim 3, further comprising performing motion adaptive deinterlacing in response to determining that the sequence of fields generated from the progressive scan source has been interrupted.

5. The method of claim 1, wherein checking for pixel positions with feathering due to motion in the second field after weaving comprises:
   checking for a change in a characteristic between the pixel value corresponding to each pixel position of the second field and the pixel values corresponding to neighboring pixels in the first field to detect pixel positions in the second field with feathering; and
   for each pixel position in the second field with feathering, determining whether the feathering is due to motion including:
   generating motion maps for a selected number preceding fields in the sequence of fields;
   combining the motion maps generated; and
   for each pixel position with detected feathering, checking a value of corresponding mapping bit in the combined motion map to determine whether the feathering is due to motion.

6. The method of claim 5, wherein the characteristic is selected from the group consisting of luminance and chrominance.

7. The method of claim 1, wherein generating the motion maps for the preceding fields in the sequence comprises:
   generating a set of motion maps including bits having values representing motion or an absence of motion between pixel positions of fields having lines of the first parity; and
   generating another set of motion maps including bits having values representing motion or an absence of motion between pixel positions of fields having lines of the first parity.

8. The method of claim 7, further comprising:
   for each pair of the preceding interlaced fields having pixel lines of the first parity:
   generating a motion map including bits having values representing motion or an absence of motion at pixel positions of the lines of the first parity by comparing the pixel values corresponding to the pixel positions of the lines of the first parity; and
   interpolating between the values of the bits representing the pixel positions of the pixel lines of the first parity to generate bits in the motion map representing pixels positions of pixel lines of the second parity.

9. The method of claim 1, wherein the first field of the pair temporally precedes the second field of the pair.

10. A video system comprising:
    a processing system operable to:
    receive first and second interlaced fields of a corresponding progressive scan frame from a sequence of interlaced fields generated from progressive scan source;
    weave pixel values corresponding to pixel positions of pixel lines of a first parity of the first field with pixel values corresponding to pixel positions of pixel lines of a second parity of the second field;
    for each pixel value corresponding to each pixel position of each pixel line of the second field after weaving, check for the corresponding pixel position for feathering due to motion;
    count detected pixel positions with feathering due to motion;
    compare a number of counted pixel positions with feathering due to motion against a threshold;
    detect that the sequence of fields generated from the progressive scan source has not changed when the number of counted pixel positions with feathering due to motion is below the threshold value; and
    detect that the sequence of fields generated from the progressive scan source has changed when the number of counted pixel positions with feathering due to motion is above the threshold value.

11. The video system of claim 10, wherein the sequence of fields are generated from the progressive scan source by a 3:2 pull-down algorithm.

12. The video system of claim 10, wherein the processing system is further operable in response to detecting that the sequence of fields has changed to determine whether the sequence of fields has been interrupted.

13. The video system of claim 12, wherein the processing system is further operable to perform motion adaptive deinterlacing in response to determining that the sequence of fields generated from the progressive scan source has been interrupted.

14. The video system of claim 10, wherein the processing system is operable to check for pixel positions with feathering due to motion in the second field after weaving by:
  checking for a change in a characteristic between the pixel value corresponding to each pixel position of the second field and the pixel values corresponding to neighboring pixels in the first field to detect pixel positions in the second field with feathering; and
  for each pixel position in the second field with feathering, determining whether the feathering is due to motion including:
  generating motion maps for a selected number preceding fields in the sequence of fields;
  combining the motion maps generated; and
  for each pixel position with detected feathering, checking a value of corresponding mapping bit in the combined motion map to determine whether the feathering is due to motion.

15. The video system of claim 14, wherein the characteristic is selected from the group consisting of luminance and chrominance.

16. The video system of claim 10, wherein the processing system is operable to generate the motion maps for the preceding fields in the sequence by:
  generating a set of motion maps including bits having values representing motion or an absence of motion between pixel positions of fields having lines of the first parity; and
  generating another set of motion maps including bits having values representing motion or an absence of motion between pixel positions of fields having lines of the first parity.

17. The video system of claim 16, wherein the processing system is further operable for each pair of the preceding interlaced fields having pixel lines of the first parity to:
  generate a motion map including bits having values representing motion or an absence of motion at pixel positions of the lines of the first parity by comparing the pixel values corresponding to the pixel positions of the lines of the first parity; and
  interpolate between the values bits representing the pixel positions of the pixel lines of the first parity to generate bits in the motion map representing pixels positions of pixel lines of the second parity.

18. The video system of claim 10, wherein the first field of the pair temporally precedes the second field of the pair.

19. The video system of claim 10, wherein the processing system is implemented at least in part in software.

20. The video system of claim 10, wherein the processing system comprises a video post-processor.

* * * * *